March 8, 1966  A. H. MARK ETAL  3,238,637
GRAIN DRYER
Filed Dec. 22, 1961  5 Sheets-Sheet 4

INVENTORS.
ALEXANDER HING MARK &
BY TIBOR G. BORNEMISZA

ATTORNEYS.

United States Patent Office 3,238,637
Patented Mar. 8, 1966

3,238,637
GRAIN DRYER
Alexander Hing Mark, Livonia, and Tibor G. Bornemisza, Detroit, Mich., assignors to Massey-Ferguson Inc., Detroit, Mich., a corporation of Maryland
Filed Dec. 22, 1961, Ser. No. 161,537
4 Claims. (Cl. 34—65)

This invention relates to agricultural crop treating apparatus and more particularly concerns a crop dryer intended for corn and other grains.

The primary aim of the present invention is to provide an efficient, high capacity, portable grain dryer which can be transported and powered by a conventional farm tractor.

Grain dryers normally extract moisture from the crop by forcing hot air through the grain. The crop is thereafter cooled to storage temperature by directing cool air through the grain. Conventionally, the heated air is generated by a burner apparatus and the cooling air is simply drawn from, and discharged back into, the surrounding atmosphere.

Accordingly, an important object of the invention is to provide a novel dryer with a heat recuperative mode of operation which applies the heat from the cooled grain to the grain being heated so as to minimize fuel consumption.

More particularly, it is an object to provide a dryer and drying method in which air from the atmosphere is first used to cool previously heated grain and the thus preheated air is then utilized to heat untreated grain.

A collateral object is to provide a dryer of the above type which requires but a single airflow generating fan and associated elements.

It is also an object to provide a dryer as characterized above having a simple grain handling system including gravity feed through the heating and cooling chambers, low level loading, and high level discharge. A detailed object is to provide a dryer of this type with a novel dual purpose elevating auger, which economically facilitates loading the dryer through a low trough and permits delivery of treated grain from a high chute.

Gravity fed grain dryers are known to the art, of course, but it has conventionally required tall structures to contain the grain and channel the heated air upwardly through the grain. This is because the air temperature must be kept low to avoid overheating at the tank bottom and, with the low initial air temperature, a long air flow path through the grain is necessary for adequate drying. Thus, it is an important object of the invention to provide a grain dryer which is quite compact, considering its capacity, and which utilizes substantially horizontal airflow so that the dryer has a relatively low silhouette. This not only facilitates transport of the dryer but also permits grain to be delivered directly into the open top of the dryer from the delivery elevator of a combine.

In one of its aspects it is an object to provide a dryer of the above type which embodies simple and effective devices for evenly spreading the grain for drying and accurately regulating the flow of grain through the entire drying and cooling cycle.

Still another object is to provide a dryer as described above which circulates air through a large mass of grain in such a way that the air moves through relatively uniform and narrow bands of grain. As a result, the airflow is uniform and constant throughout the grain mass, and resistance to the airflow is minimized thereby allowing a low pressure but economical axial flow blower to be efficiently utilized.

Moreover, it is an object to provide a dryer as described above having a lightweight, honeycomb construction which is economical to manufacture, easy to transport and yet capable of handling substantial quantities of grain.

Other objects and advantages of the invention will become apparent upon reading the following detailed description and upon reference to the drawings, in which.

Figure 1:
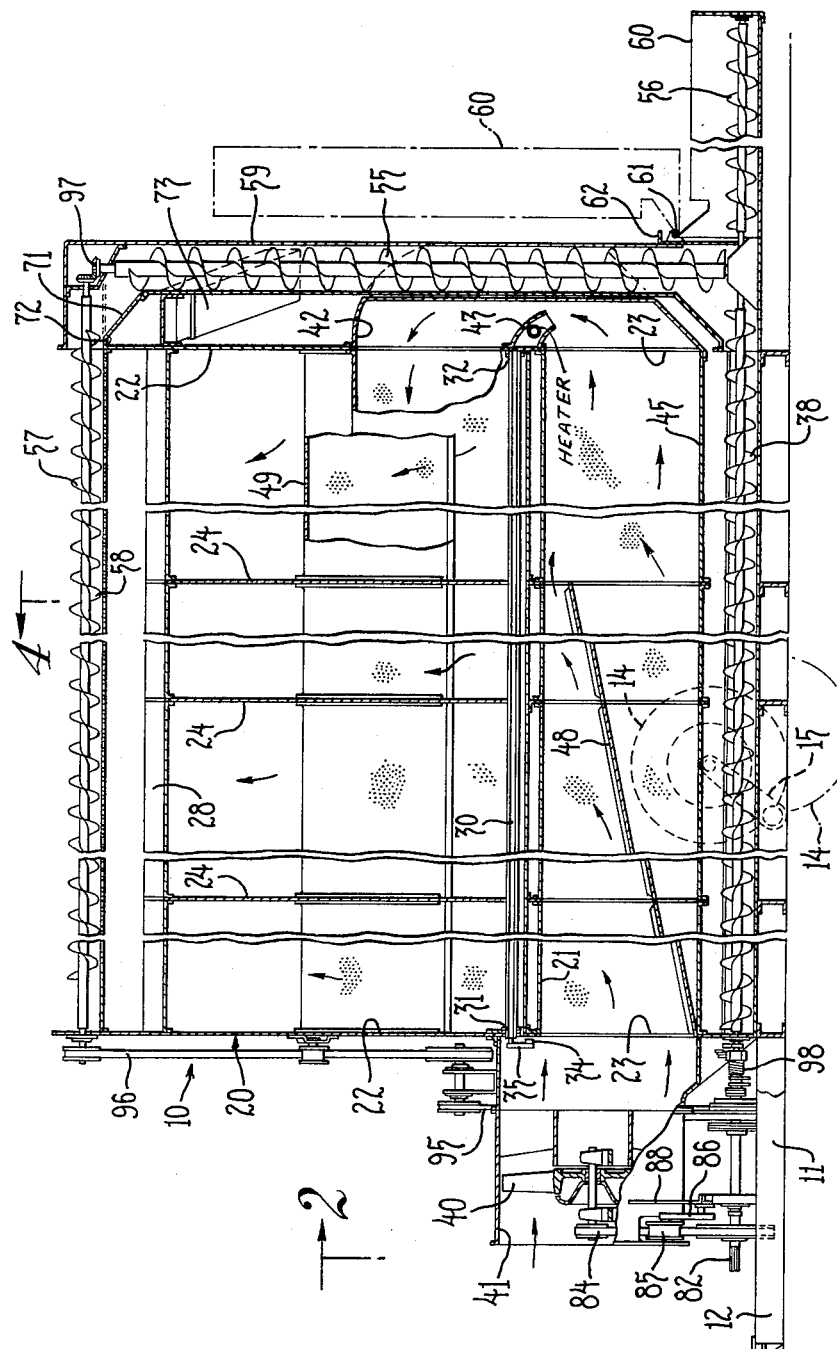
FIGURE 1 is a longitudinal vertical section, with portions broken away, of a grain dryer constructed in accordance with the invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown a grain dryer 10 constructed in accordance with the invention and including a main frame or chassis 11 having a tongue portion 12 at its forward end that terminates in a hitch 13. In the illustrated embodiment the dryer 10 is portable and hence is provided with a pair of transport wheels 14 which are journaled on arms 15 that are pivoted on opposite sides of the main frame 11. The arms 15 are shown swung upwardly in FIGS. 1, 2 and 4 so that the main frame 11 rests directly on the surface of the ground. To ready the dryer for transport, the arms 15 are swung downwardly so as to bring the wheels 14 into the dashed line positions shown in FIGS. 1 and 4, thereby raising the dryer 10 onto the wheels. The hitch 13 is then coupled to a tractor enabling the dryer to be easily transported.

Since the main frame 11 can be lowered onto the ground when the dryer 10 is to be operated, the wheels 14 and their supporting structure need not bear the substantial weight of the mass of grain contained within the dryer when it is in operation.

To contain the grain being treated, a sheet metal tank 20 is rigidly mounted on the main frame 11 and provided with a central double insulating wall 21 dividing the tank into upper and lower chambers, 22 and 23, respectively. The chambers 22, 23 extend longitudinally of the dryer 10 for virtually its full length. For strength and rigidity, a plurality of transverse bulkheads 24 are provided within the chambers 22, 23. Preferably, the bulkheads are formed with a plurality of holes 25 which permit longitudinal air flow through the chambers 22, 23 while channelizing the grain for vertical movement.

To permit simple gravity feed of the grain being treated by the dryer 10, the upper chamber 22 is the heating chamber in which moisture is driven from the grain and the lower chamber 23 is the cooling chamber wherein the temperature of the grain is brought down to storable level. The tank 20 is open topped and grain dropped into the tank falls on a plurality of sloped baffles 28 mounted on the upper edges of the bulkheads 24. The baffles 28 slope transversely and define elongated ports 29 through which the grain falls into the heating chamber 22. The lateral spacing of the ports 29 assures good distribution of the grain that is dropped into the tank 20.

A plurality of elongated valves 30 are disposed longitudinally of the dryer 10 in spaced openings formed in the double wall 21. The valves 30 control the flow of grain from the upper heating chamber 22 to the lower cooling chamber 23, and, in the preferred embodiment, the valves comprise an elongated arcuate shield rotatably mounted at 31 and 32 in the opposite end walls of the tank 20 (see FIG. 1). An operating member 33 is secured to one of the valve members and a link 34 and a plurality of arms 35 couple all of the valves 30 to the operating member 33 (see FIG. 2). Swinging movement of the operating member 33 thus selectively positions the rotatable shields forming the valves 30 so as to open or close the grain flowing openings between the upper and lower chambers 22, 23 of the dryer.

The upper heating chamber 22 is provided with transversely sloping floor plates 36 which are effective to direct the grain in the chamber 22 to the longitudinally extending valves 30. The lower cooling chamber 23 is also formed with transversely sloping floor plates 37 which direct grain in the lower chamber to a longitudinally extending discharge conveyor in the form of an auger 38. It can therefore be seen that from the time that grain is dropped into the open top of the tank 20, simple gravity feed is utilized to carry the grain through the heating chamber 22, the cooling chamber 23, and the discharge auger 38.

In keeping with the invention, a fan 40 is arranged in a tunnel 41 to direct cool, outside air into one end of the lower chamber 23, and a passage 42 containing a heating device 43 directs the air stream from the opposite end of the lower chamber 23 to one end of the heating chamber 22 (see FIG. 1). The heating device 43 is preferably an oil or gas fired burner which raises the temperature of the air moving in the passage 42 to a hot, drying stream which flows through and heats the grain in the upper chamber 22. During operation, it can thus be seen that grain in the chamber 22 is heated by the hot blast of air from the passage 42 whereupon the grain flows downwardly through the valves 30 into the lower chamber 23 to be cooled by the entering air stream generated by the fan 40.

It will be appreciated that the entering air stream, in the process of cooling the grain in the chamber 23, becomes preheated so that the heat energy used for drying the grain in the upper chamber 22 is at least partially recouped in preheating the air which is used to treat additional grain. In other words, the heat drawn by the cooling air stream from the grain in the lower chamber 23 is fed back into the upper chamber 22 to assist in the drying operation.

Figure 4:
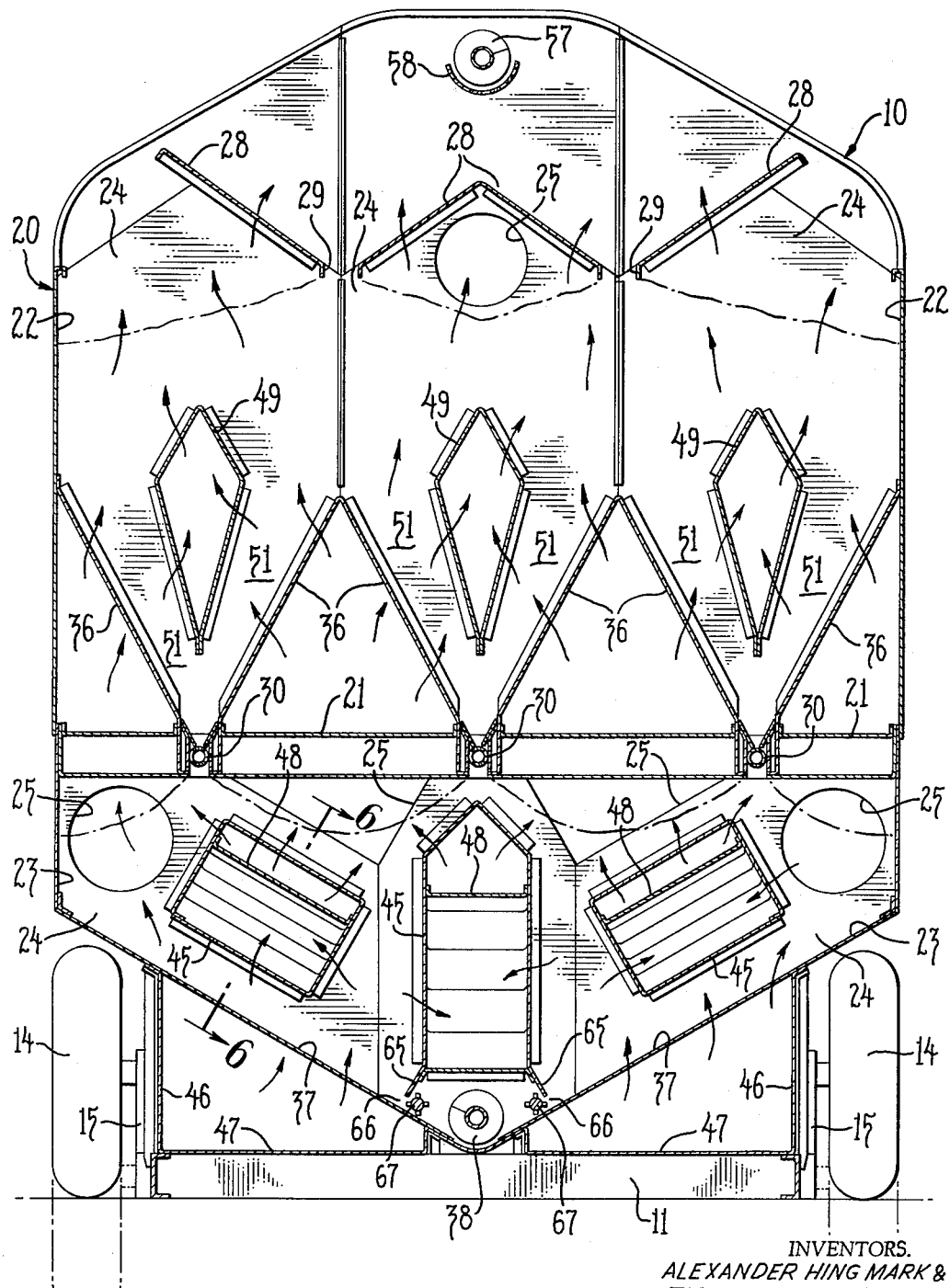
FIG. 4 is an enlarged transverse section taken approximately along the line 4—4 in FIG. 1.
Figure 5:
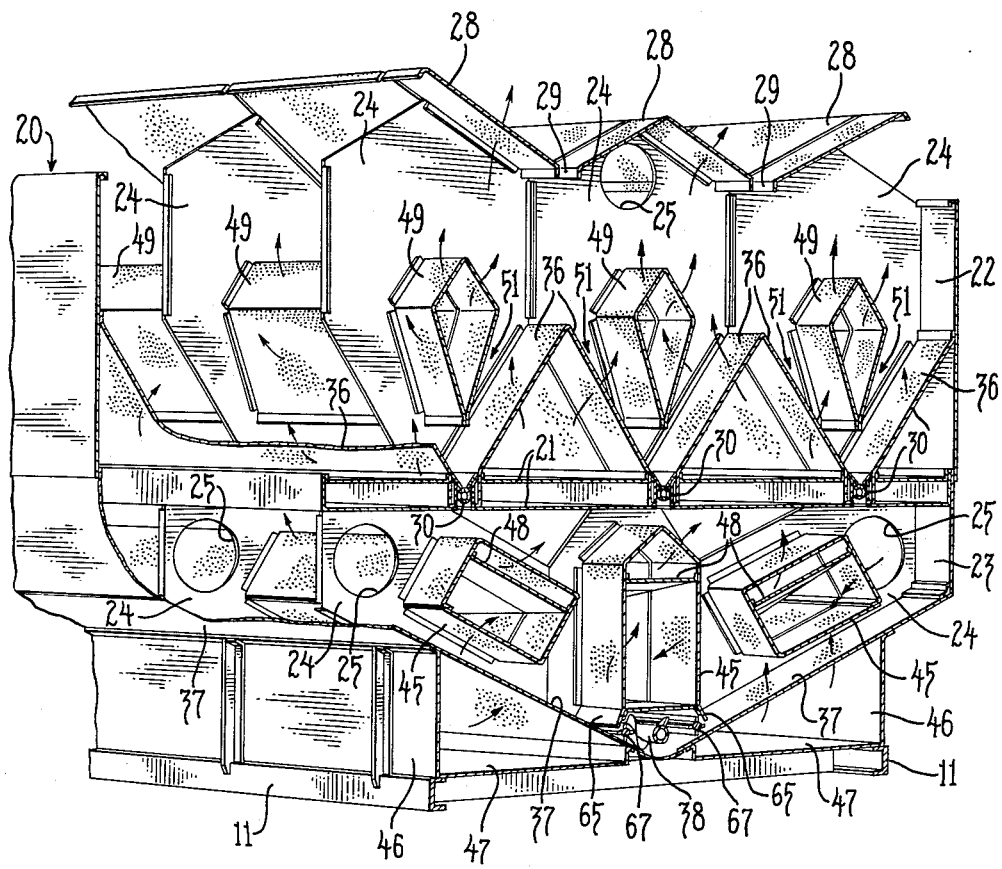
FIG. 5 is a fragmentary perspective of a section of the dryer of FIG. 1 with portions broken away for clarity in illustrating the construction.

To obtain effective cooling throughout the length of the lower chamber 23, a plurality of air distributing conduits 45 are extended longitudinally through the bulkheads 24 in the lower chamber 23, and additional longitudinally extended conduits are formed by tank walls 46 and 47 beneath the floor plates 37 (see FIGS. 4 and 5).

The conduits 45, and the conduits formed beneath the floor plates 37 by the walls 46, 47, are all open to the tunnel 41 at the forward end of the dryer 10, and the walls of the conduit 45 and the floor plates 37 are formed of perforate screen-like material. In addition, the conduits 45 are provided with imperforate inner baffle plates 48 which are disposed diagonally so as to force air from the fan tunnel 41 through the perforate walls of the conduits 45 along the full length of the lower chamber 23.

Figure 6:
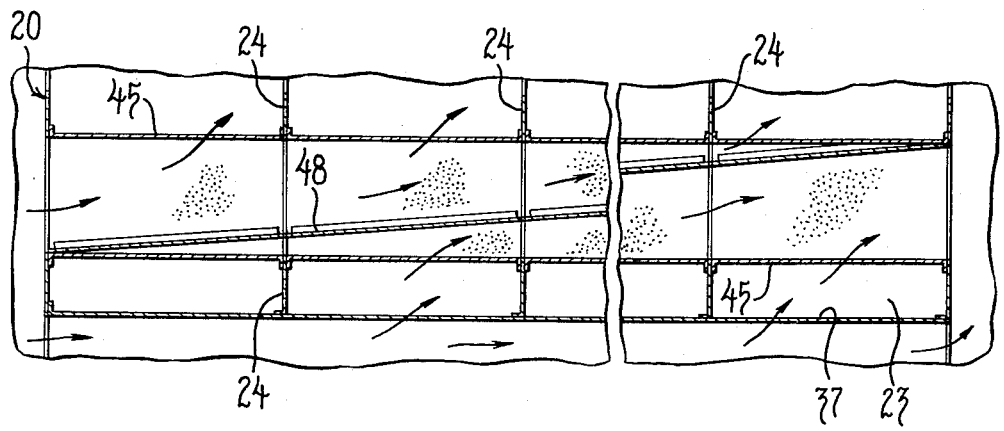
FIG. 6 is a fragmentary section taken approximately along the line 6—6 in FIG. 4.

The air stream thus follows the directions of the arrows appearing in FIGS. 1, 4 and 6. That is, the cool outside air drawn through the tunnel 41 by the fan 40 passes along the full length of the conduits formed beneath the floor plates 37 and moves through the perforate floor plates 37 through the grain to be cooled. Additional air moves into the lower chamber 23 through the conduits 45 and this air is expelled, throughout the full length of the lower chamber, through the perforate walls of the conduits 45 by the inclined baffle plates 48. The air, having been forced through the grain to be cooled, is exhausted from the lower chamber 23 by re-entering the conduits 45 beneath the baffle plates 48. Additional air moves through the openings 25 in the bulkheads 24 longitudinally along the chamber 23. At the rear of the dryer 10, the conduits 45 and the rearmost openings 25 open into the passage 42 with the result that the heated air, having been forced through the grain in the chamber 23 to cool the grain, moves upwardly past the burner 43 in the passage 42 and is heated to form a hot drying air stream.

To effectively distribute the heated air through the grain along the length of the upper chamber 22, the floor plates 36 in the upper chamber together with the insulating wall 22 form air distributing conduits running the length of the dryer. Also, a plurality of conduits 49 having closed ends and perforate walls are disposed longitudinally of the tank 20 in the upper chamber so as to define relatively narrow channels 51 between the conduits 49 and the floor plates 36 through which the grain must flow and the heated air must pass. The conduits defined by the floor plates 36 and the insulating wall 21 receive the hot air from the passage 42 and the air is thus directed the length of the dryer beneath the floor plates. The hot air rises through the perforate floor plates and transversely through the narrow passages 51, in the direction of the arrows shown in FIGS. 1, 4 and 5, so that the air passes into and through the closed conduits 49 and up into the remainder of the grain mass in the chamber 22. Finally, the air is discharged upwardly through the open top of the tank 20.

Since the grain is forced to flow in relatively narrow streams through the passages 51, it can be seen that the hot air entering the heating chamber 22 through the perforate walls 36 is called upon to heat relatively small masses of grain and thus the heating action is particularly effective. The hot air carrying the moisture from the grain freely escapes through the unobstructed top of the tank.

All of the conduits in the chambers 22, 23, i.e., the conduits 45, 49, are formed with peaked upper portions so as to minimize the resistance created by the conduits to downward grain flow through the tank 20.

So as to distribute grain the full length of the tank 20 in the upper chamber 22, an elevating auger 55 feeds grain from a pivotally mounted receiving auger 56 to a distributing auger 57. The distributing auger 57 is journaled in the end walls of the tank 20 and rotates above the baffle plates 28 in a perforated channel 58. The elevating auger 55 rotates in a vertical tube 59 that is partially recessed in an arcuate portion of the passage 42 at the rear of the dryer 10 (see FIG. 1).

The receiving auger 56 is journaled in an open topped trough 60 that is pivoted at 61 to the tube 59. The trough 60 and the receiving auger 56 can thus be swung from their solid line, operating position shown in FIG. 1 to the dashed line storage position also illustrated in this figure. A sliding door 62 closes the access opening from the receiving auger 56 to the elevating auger 55.

In operation, grain may be dumped in the trough 60 so that the receiving auger 56 urges the grain through the then open door 62 where it is received by the elevating auger 55 and lifted upwardly at the rear end of the combine. The elevating auger 55 feeds the grain to the distributing auger 57 which tends to move the grain along the perforate channel 58. Because of the perforations, the grain drops through the channel 58 as it is fed along by the auger 57 and hence the grain is distributed longitudinally of the tank 20. The falling grain strikes the baffle plates 28 and so is further distributed laterally to enter the upper chamber 22 through the ports 29.

Alternatively, of course, the upper chamber 22 can be filled with grain by simply dumping the grain through the open top of the tank 20. Thus, a combine having a conventional high level discharge auger can feed grain directly into the top of the dryer 10.

To control the rate of grain discharge from the dryer, longitudinally extending plates 65 enclose the discharge conveyor 38 so that access to the discharge auger from the cooling chamber 23 is restricted to a pair of longitudinally extending slots 66 in which elongated ribbed valve members 67 rotate (see particularly FIG. 4). As will be readily apparent, rotation of the ribbed members 67 control the entrance of grain through the slots 66 to the trough in which the auger 38 rotates, and thus the rate at which the members 67 rotate selects the speed or rate at which grain is discharged from the lower chamber 23. Since grain can flow downwardly through the valves 30 from the upper chamber 22 only as fast as grain is discharged from the lower chamber 23, it will be understood that the rotation rate of the ribbed members 67 determines the rate at which both the cooling and heating operations are carried out.

For obtaining a high level discharge point from the dryer 10 so that the grain can be conveniently loaded into a truck or suitable storage container, the discharge conveyor 38 feeds the grain from front to rear of the dryer 10 so that the grain again is received by the elevating auger 55. A positionable valve plate 71 is pivoted at 72 on the end wall of the tank 20 so as to be swingable from the solid line position shown in FIG. 1, whereby the grain from the elevating auger 55 is passed to the distributing auger 57, to a dashed line position also appearing in FIG. 1 which causes the grain lifted by the elevating auger 55 to spill from the tube 59 into a discharge chute 73 that extends laterally from the dryer 10. The elevating auger 55 thus serves a double purpose. First, it lifts untreated grain from the receiving trough 60 to the distributing auger 57. Second, after the dryer has been charged and is in operation, the elevating auger 55 lifts treated grain from the discharge auger 38 to the high level discharge chute 73.

To power the dryer 10, a pair of PTO coupling shafts 81 and 82 are journaled in the main frame 12 at the front or hitch end of the dryer so that either one of the shafts can be driven from the PTO of a tractor or other power source. A chain and sprocket connection 83 couples the shafts 81, 82 so that they rotate in unison but at different speeds. In the preferred embodiment, the shaft 81 is the low speed shaft intended to be driven by a tractor PTO having a normal output speed of 540 r.p.m., while the shaft 82 is the high speed shaft and is adapted for being driven by a tractor PTO having a normal operating speed of 1000 r.p.m.

The fan 40 is driven from the high speed shaft 82 by a belt 84. To provide a clutch in the fan drive, a belt-tightening pulley 85 is journaled on an arm 86 which is pivoted at 87 on the frame of the dryer. A control lever 88 is pivoted at 89 on the dryer frame and is coupled by a toggle link 90 to the lower end of the idler pulley arm 86 (see FIG. 2). With the control lever 80 swung to its solid line position in FIG. 2, the lever 88 and the link 90 overcenter so as to lock the arm 86 against swinging movement with the idler pulley 85 in firm engagement with the belt 84. Thus, a pulley drive is established from the high speed shaft 82 to the fan 40. Lifting the control lever 88 overcenters the toggle link 90 and swings the idler pulley arm 86 in a clockwise direction as seen in FIG. 2 so as to loosen the pulley 84 and interrupt the drive to the fan 40.

Figure 2:
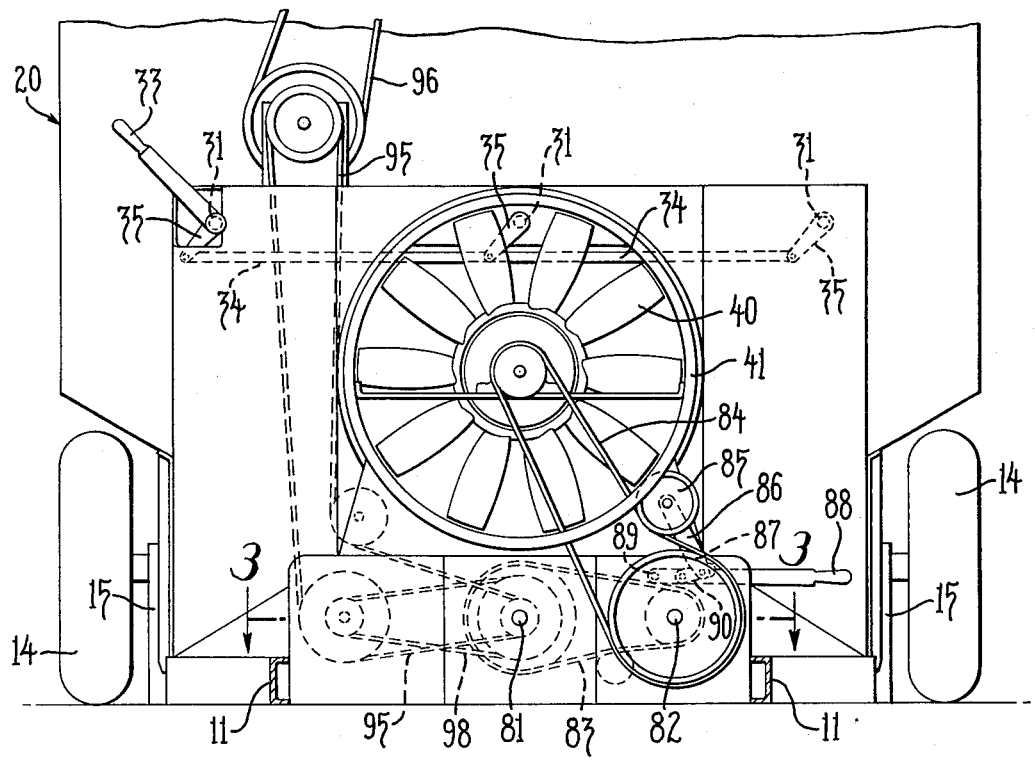
FIG. 2 is an enlarged fragmentary elevation taken approximately along the line 2—2 in FIG. 1.
Figure 3:
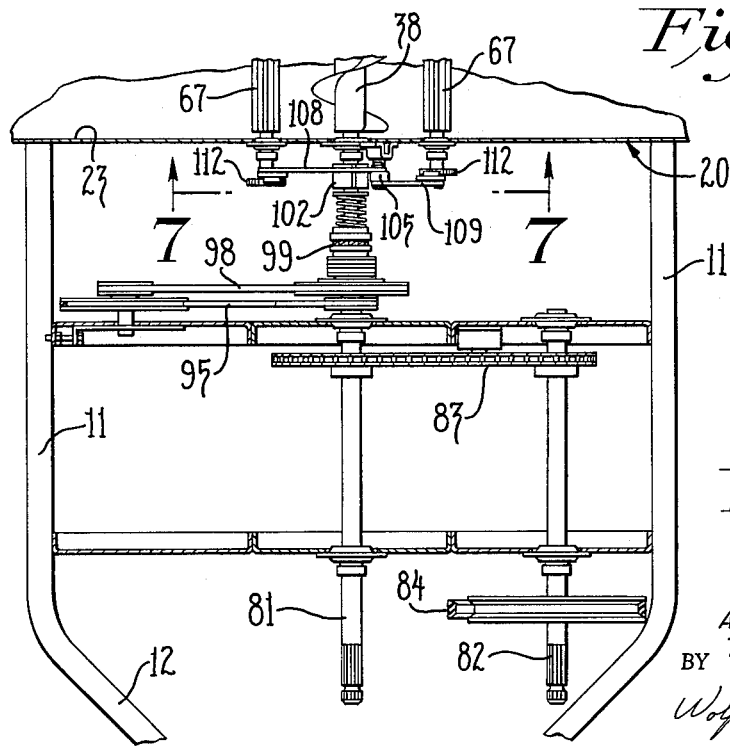
FIG. 3 is a further enlarged fragmentary section taken approximately along the line 3—3 in FIG. 2.

The distributing auger 57 is driven from the low speed shaft 81 through sets of pulleys and belts 95 and 96 (see FIGS. 1, 2 and 3). The elevating auger 55 is driven by bevel gearing 97 from the rear end of the distributing auger 57, and the receiving auger 56 is driven by separable bevel gearing, not shown, from the lower end of the elevating auger 55 (see FIG. 1). The discharge auger 38 is also driven from the low speed shaft 81 through the belt 95 and a belt 98 which, together, constitute a speed reduction arrangement from the shaft 81 to the auger 38 (see FIGS. 2 and 3). Preferably, a spring biased friction clutch 99 is interposed in the drive from the belt 98 to the auger 38 so as to provide a safety overload release from the power input of the dryer 10 to the discharge auger 38.

Figure 7:
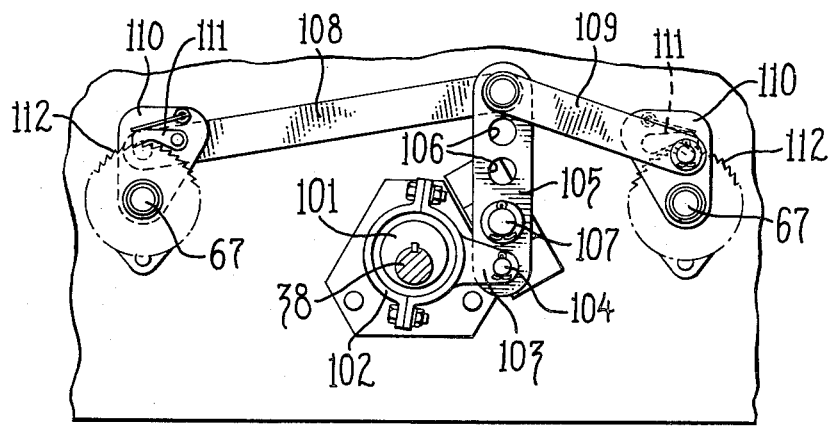
FIG. 7 is a fragmentary section taken approximately along the line 7—7 in FIG. 3.

For controlling the rate of grain discharge from the dryer 10, the ribbed valve members 67 are intermittently rotated or stepped at selectable rates by an eccentric 101 carried on the shaft of the discharge auger 38 (see FIG. 7). A collar 102 rotatably surrounds the eccentric 101 and is formed with an arm 103 which is pinned at 104 to a lever 105. The lever 105 is provided with a plurality of pivot holes 106, any one of which can be slipped over and secured to a pivot pin 107 so as to vary the throw of the arm 105 upon rotation of the eccentric 101. The upper end of the arm 105 is connected by a pair of links 108 and 109 to pawl plates 110 carrying pawls 111 which cooperate with ratchets 112 secured to the ribbed members 67.

Thus, rotation of the discharge auger 38 causes the eccentric 101 to oscillate the arm 103, thereby swinging the lever 105 about the pivot pin 107. This motion is transmitted through the links 108, 109 to the pawls 111 so as to intermittently advance the ribbed valve members 67. The degree of rotation of the members 67 upon each revolution of the cam 101 is dependent upon the throw of the lever 105 and this can be varied by placing selected ones of the lever openings 106 over the pivot pin 107. In this way, the operator of the dryer 10 can select a discharge rate, and thus a crop treatment rate, that is proper for the condition of the grain being handled.

In summary, it is most important to note that the dryer 10 embodies a heat recuperative mode of operation which is particularly efficient and economical. More specifically, the heat obtained from cooling the previously heated grain is utilized for the further heating and drying of additional grain. In this connection, it is also important to note that only a single air flow generating fan is required.

By disposing the heating chamber 22 above the cooling chamber 23, a simple gravity grain feed arrangement through the dryer 10 is made possible. Grain handling is further simplified for the operator of the dryer 10 in that a choice of low level loading through the trough 60 or high level loading directly through the open top of the tank 20 is possible. In addition, grain is discharged from the dryer 10 at a relatively high level from the chute 73.

By using virtually horizontal air flow, the dryer 10 is quite compact and has a low silhouette despite its high capacity. The low silhouette not only facilitates transport of the dryer but also makes it possible for a combine to deliver grain directly through the open top of the tank 20 into the dryer.

Because of the conduit and air passage arrangement in the dryer 10, the cooling and heating air streams move vertically through relatively uniform and narrow bands of grain throughout the length of the dryer. Air flow is thus uniform throughout the grain mass, and airflow resistance is minimized thereby allowing the efficient utilization of the low pressure axial flow fan 40.

Specific mention should also be made of the exceptionally strong and rigid, though lightweight, honeycomb construction of the dryer 10 which perhaps can best be appreciated by considering FIG. 5. The bulkheads 24, baffles 28, floor plates 36, 37 and conduits 45, 49 all act together to produce particularly rigid structure. It may also be seen that the dryer can be economically manufactured using standard sheet metal fabrication methods and techniques.

We claim as our invention:

1. A grain dryer comprising, in combination, an elongated tank having longitudinally extending upper and lower chambers, a fan disposed at one end of said tank and arranged to direct air longitudinally into one end of said lower chamber, means defining a vertically extending passage at the other end of said tank for directing air from the other end of said lower chamber up to said upper chamber with the air being directed horizontally into the lower portion of the upper chamber, a heating device disposed in said passage for raising the temperature of the air rising therethrough, a grain distributing auger journaled longitudinally at the top of said upper chamber, a perforated channel underlying said auger, means for rotating said auger so as to drive grain along the channel and thus distribute it along said upper chamber, a longitudinally extending valve between said upper and lower chambers for flowing heated grain from said upper chamber to said lower chamber, the floor of said upper chamber being sloped toward said valve, and a discharge conveyor extending longitudinally along the bottom of said lower chamber, means enclosing said conveyor so as to restrict grain flow thereto to a longitudinally extending slot, a ribbed valve member rotatably mounted so as to block said slot, and means for rotating said valve member to admit grain to said conveyor from said lower chamber at a selected rate.

2. A grain dryer comprising, in combination, a tank having an upper chamber and a lower chamber, a fan disposed at one end of said tank and arranged to direct air into one end of said lower chamber, means defining a vertically extending passage at the other end of said tank for directing air from the other end of said lower chamber into the lower portion of said upper chamber, a heating device disposed in said passage for raising the temperature of the air passing therethrough, distributing means for dropping grain into said upper chamber, a valve between said upper and lower chambers for flowing heated grain from said upper chamber to said lower chamber, a discharge conveyor at the bottom of said lower chamber for feeding cooled grain from said tank, a vertically disposed elevator mounted on said tank so as to extend from the discharge end of said conveyor to the receiving end of said distributing means, said conveyor and said elevator being in communication, means defining a closeable opening at the lower end of said elevator permitting grain to be fed thereto, a discharge chute adjacent the upper end of said elevator, and means for directing grain from said elevator to either said distributing means or said discharge chute so that the elevator can be used to load or unload said tank.

3. A grain dryer comprising, in combination, an elongated tank having longitudinally extending upper and lower chambers, a fan disposed at one end of said tank and arranged to direct air longitudinally into one end of said lower chamber, an air distributing conduit extending longitudinally of said tank in said lower chamber and having one end open to receive air from said fan, said conduit having perforate walls and an imperforate inner baffle plate disposed diagonally in said conduit so as to force air from said fan through said perforate walls along the length of the lower chamber, means defining a vertically extending passage at the other end of said lower chamber up to said upper chamber, a heating device disposed in said passage for raising the temperature of the air rising therethrough, means for feeding grain into and distributing the grain longitudinally of said upper chamber, a longitudinally extending valve between said upper and lower chambers for flowing heated grain from said upper chamber to said lower chamber, the floor of said upper chamber being sloped toward said valve, said floor being perforated and said means defining a passage being effective to direct said heated air horizontally into the region beneath the floor, a closed conduit formed with perforated walls extending longitudinally of said tank in said upper chamber so as to define relatively narrow channels between the conduit and the floor through which grain flows to said valve, and a discharge conveyor at the bottom of said lower chamber for feeding cooled grain from said tank.

4. A grain dryer comprising, in combination, a tank having an upper chamber and a lower chamber, said chambers being subdivided by a plurality of bulkheads, said bulkheads having openings therethrough to permit horizontal airflow, a fan disposed at one end of said tank and arranged to direct air into one end of said lower chamber, an air distributing conduit extending through said bulkheads in said lower chamber and having one end open to receive air from said fan, said conduit having perforate walls and an imperforate inner baffle plate disposed diagonally in said conduit so as to force air from said fan through said perforate walls along the length of the lower chamber, means defining a vertically extending passage at the other end of said tank for directing air from the other end of said lower chamber beneath the floor of said upper chamber, said floor being perforated, a closed conduit formed with perforated walls extending through said bulkheads of said tank in said upper chamber so as to define relatively narrow channels between the conduit and the floor through which grain flows downwardly, a heating device disposed in said passage for raising the temperature of the air passing therethrough, means for dropping grain into said upper chamber, a valve between said upper and lower chambers for flowing heated grain from said upper chamber to said lower chamber, and a discharge conveyor at the bottom of said lower chamber for feeding cooled grain from said tank.

References Cited by the Examiner

UNITED STATES PATENTS

| | | | |
|---|---|---|---|
| 265,370 | 10/1882 | Barr | 98—57 |
| 707,323 | 8/1902 | Hess | 34—65 |
| 1,127,974 | 2/1915 | Ellis | 34—65 |
| 1,151,268 | 8/1915 | Hess | 34—174 |
| 2,437,899 | 3/1948 | Welty | 34—65 |
| 2,706,345 | 4/1955 | Arndt | 34—65 |
| 2,740,204 | 4/1956 | Seltzer | 34—174 |
| 2,949,843 | 8/1960 | Mack | 98—57 |
| 2,966,110 | 12/1960 | Burfield | 98—57 |
| 3,000,107 | 9/1961 | Ryan | 34—174 |

WILLIAM F. O'DEA, *Primary Examiner.*

NORMAN YUDKOFF, *Examiner.*